United States Patent [19]
Kornely

[11] Patent Number: 5,542,525
[45] Date of Patent: Aug. 6, 1996

[54] DYNAMIC BELT CLEANING UNIT AND METHOD OF CLEANING BELTS

[75] Inventor: Leroy A. Kornely, Janesville, Wis.

[73] Assignee: Chrysler Corporation, Auburn Hills, Mich.

[21] Appl. No.: 499,845

[22] Filed: Jul. 10, 1995

[51] Int. Cl.⁶ .................................................. B65G 45/00
[52] U.S. Cl. .......................................... 198/495; 198/497
[58] Field of Search ............................. 198/493–495, 198/497; 15/302

[56] References Cited

U.S. PATENT DOCUMENTS

| | | | |
|---|---|---|---|
| 1,617,833 | 2/1927 | Armstrong . | |
| 2,651,065 | 9/1953 | O'Connor . | |
| 3,178,745 | 4/1965 | Kleebauer . | |
| 3,223,097 | 12/1965 | Spaulding . | |
| 3,454,150 | 7/1969 | Johnson | 198/494 X |
| 3,815,728 | 6/1974 | Vaughn | 198/495 |
| 4,202,437 | 5/1980 | Gordon | 198/497 |
| 4,561,144 | 12/1985 | Marais . | |
| 4,960,200 | 10/1990 | Pierce | 198/495 |
| 5,067,192 | 11/1991 | Gueiff et al. . | |
| 5,355,992 | 10/1994 | Baig et al. | 198/495 |
| 5,372,242 | 12/1994 | McInnes et al. | 198/495 |

FOREIGN PATENT DOCUMENTS

| | | | |
|---|---|---|---|
| 1263596 | 10/1986 | U.S.S.R. | 198/494 |

*Primary Examiner*—D. Glenn Dayoan
*Attorney, Agent, or Firm*—Edward A. Craig

[57] ABSTRACT

Cleaning unit for a work transfer belt having a stationary top support frame to which a box-like lower main body is attached that contains belt cleaning devices. The top support frame provides an upper closure for the main body and cooperates therewith to form spaced entrance and exit openings isolating sections of the belt feeding through the unit. A manifold mounted in the main body directs washing fluid on the belt as it moves through the unit. The main body has a removable module supporting magnets for removing metallic particles and a squeegee unit for removing moisture and foreign matter from the belt. A squeegee mounting system keeps the squeegee blades in spring loaded contact with the belt. A wear indicator connected to the squeegee mounting system exhibits operational wear of the squeegee blades. The module with the squeegee and magnet aboard can be removed from the main body for refurbishment of module mounted components at a remote location.

11 Claims, 3 Drawing Sheets

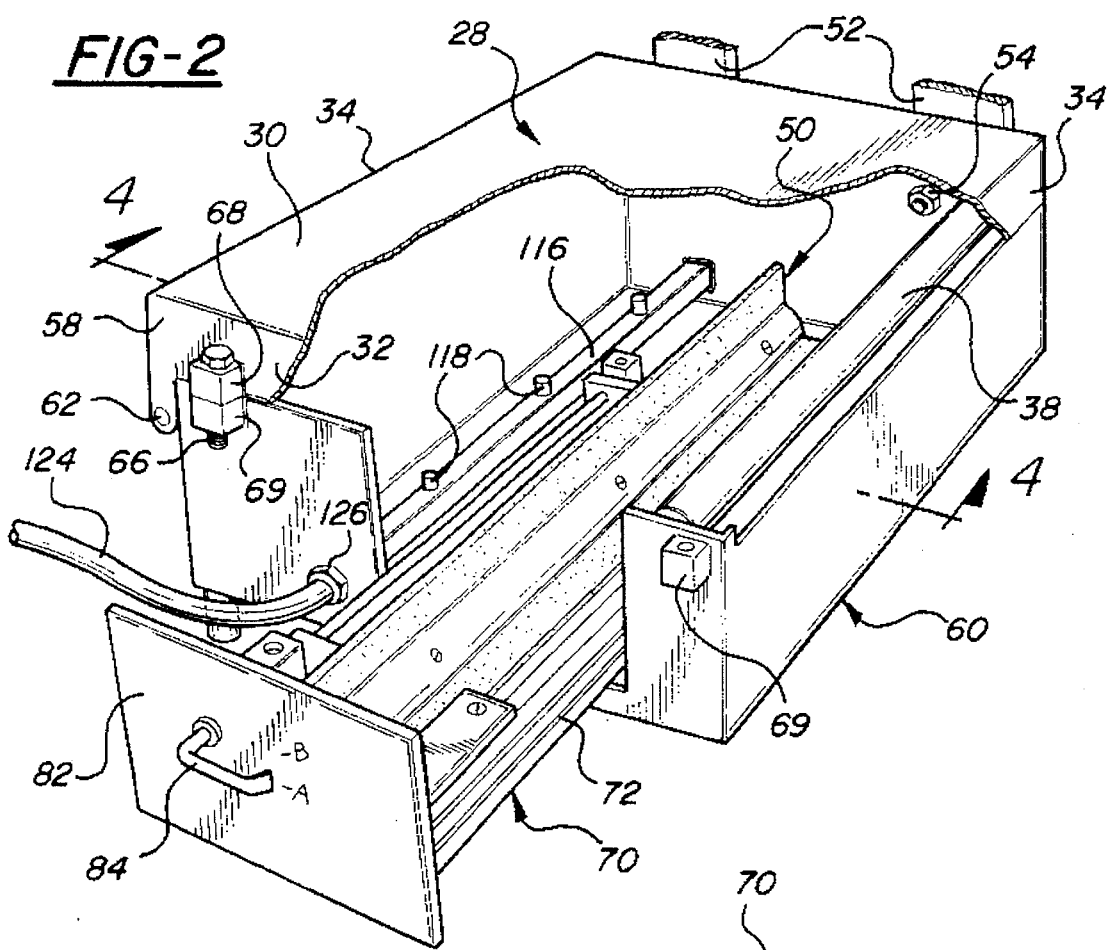
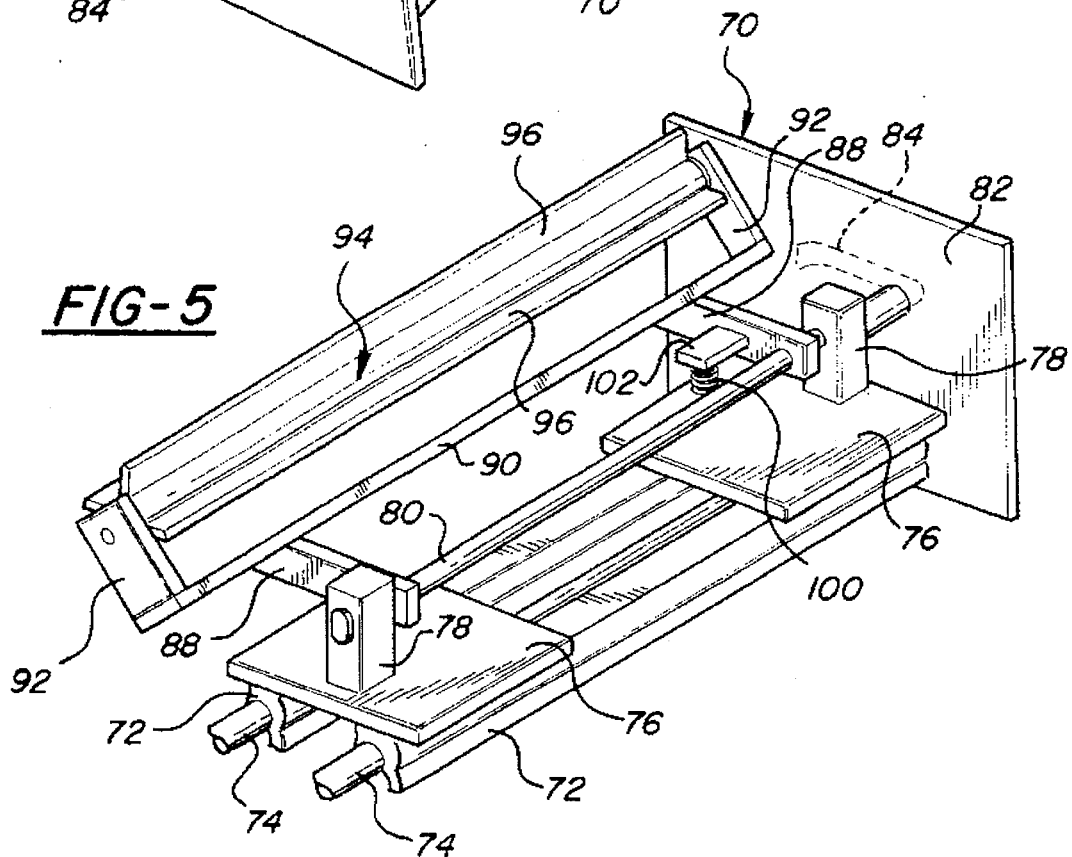

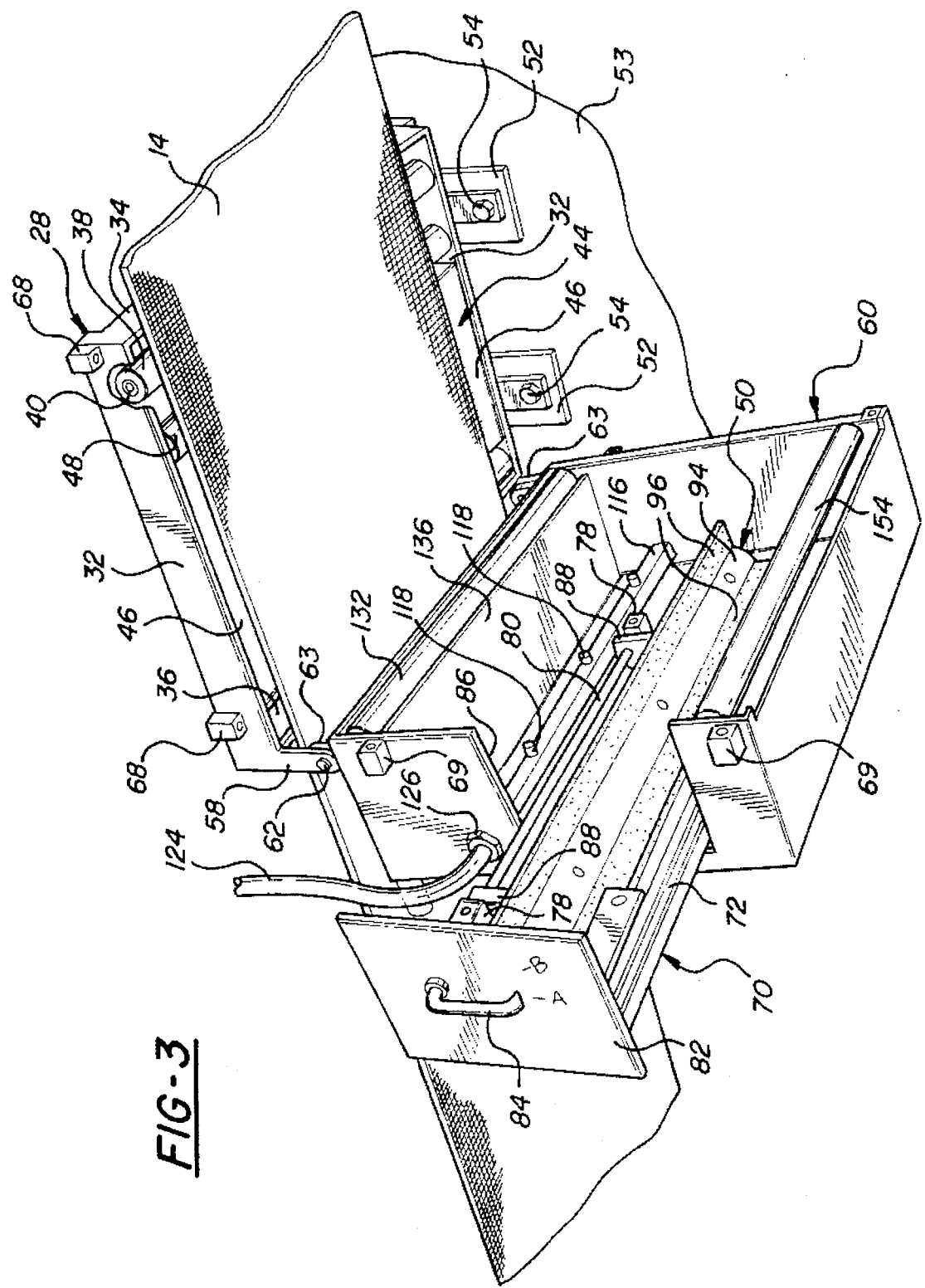

DYNAMIC BELT CLEANING UNIT AND METHOD OF CLEANING BELTS

FIELD OF THE INVENTION

This invention relates to the cleaning of article transfer or conveyor belts, and more particularly, to a new and improved dynamic cleaning unit for cleaning belts to thoroughly remove foreign matter accumulating thereon to prevent foreign matter contamination of articles or material being transferred by the belt.

BACKGROUND OF THE INVENTION

Among the on going quality problems that face most stamping facilities are those involved with the feeding of clean blanks into die sets so that the parts being struck or reformed are not blemished by foreign matter known as "dirt" often picked up by the blank from the transfer belt. Even minute particles of such dirt, i.e., metal flakes or shavings, grinding dust, paint chips and coatings, which are picked up by the blank being conveyed cause objectionable defects. This is particularly the case when such dirt finds its way between the sheet metal of the blank and the die surface and cause small blemishes or "pimples" to be formed on the part during the stamping process.

Such blemishes are generally very noticeable and are very objectionable defects that show through paint jobs subsequently applied to the stamped part. The painted surface often appear as pitted or roughened spots or areas on the finished part. These surface and paint defects lead to part rejection resulting in expensive refinishing or scrapping which materially adds to part costs and detracts from production efficiency.

To solve or substantially alleviate such problems, the present invention is drawn to new and improved mechanisms and methods for cleaning transfer belts on a continuous basis so that "dirt" will be eliminated from the belt before blank pick-up and the feed of the blank into a die set. With elimination of such dirt, contamination of the blanks by belt born dirt during blank conveyance on the belt is eliminated or sharply reduced.

More particularly, the invention is further drawn to a new and improved and compact transfer belt cleaning unit which in a preferred configuration, has a shell-like housing of two main components which when closed contains a cleaning or washing fluid manifold that directs sprays of washing fluid onto the belt to remove contaminants therefrom and which encloses and isolates sections of the belt as it feeds therethrough. The housing also contains mechanisms which collect metal particles and wipes dirt off of the belt moving therethrough on a continuous basis. In this invention, a magnet is advantageously employed to pick-up metal particles such as steel filings and flakes from the surface of the belt during cleaning operation.

This invention is still further drawn to a new and improved belt cleaning method that significantly reduces the amount of "dirt" previously transmitted from the belt onto a metal blank being transferred into stamping dies and then between the die and the metal blank to thereby prevent the stamping of parts having a wide range of dirt induced deformations or imperfections in the surfaces thereof.

In a preferred embodiment of the washer unit of invention, a top or box-like upper support frame contains a belt entry back-up roller, a belt deflector plate, a squeegee back-up roller, and a back-up belt exit roller. All rollers may be mounted on needle roller bearings to reduce friction on the belt during belt start and stop cycles. The belt deflector plate backs up the belt above the washing fluid sprayers and the magnets to stabilize the belt from spray induced vibration as well as other causes prior to "squeegee" or belt wiping action. The squeegee back-up roller is located directly above the squeegee blade and maintains a position which reduces friction and provides a backing or reaction for the pressure loads needed by the squeegee blades to mechanically wipe dirt particles as well as the belt wash fluid off the belt. The back-up entry and exit rollers are disposed against the top of the belt and spring biased entrance and exit belt support rollers in a lower body align with the corresponding back-up entry and exit roller to act as fluid seals to help keep the belt wash fluid inside the washer unit.

The main body of the unit which mounts to the top frame by a side hinge system and can be swung out of the way to simplify belt access and belt replacement when necessary. There are spaced side anchor points fixed toward the front of the housing as provided by the upper frame and main body that releasably secure these two parts together for normal belt cleaning operation.

A floating belt supporting entrance roller is mounted by a spring and gibb guide system in the main housing that provides for varying belt thicknesses and that materially aids in keeping the wash cavity of the main housing sealed. A wash spray manifold mounted in the cavity of the main housing distributes streams of pressurized water and detergents or other cleaning fluid directly onto the belt with high velocity from a plurality of laterally spaced nozzles. The spray impacts the dirt across the entire width of the belt and flushes such material therefrom. The spray also dilutes the built up of any belt wash concentrate or other materials still adhering thereto to augment subsequent cleaning by the wiping blade of the squeegee.

The lower main body also has a belt supporting exit roller mounted on a floating spring gibb system that seals the cavity of the unit while adjustably accommodating various belt thicknesses. There are two splash baffles mounted internally in the lower housing that prevent excess fluid from flooding the entrance and exit rollers. A pipe nipple welded or otherwise mounted into the floor of the main body serves as a connection for a fluid drain pipe leading back to a reservoir. A fluid inlet fitting welded into a side wall of the main body connects to the spray manifold to provide a connection to a flexible fluid supply line between a hard pipe system feeding the cleaning fluid to the cleaning unit.

There are two slide rails mounted inside the cavity of the lower main body that support and guide the removable squeegee and magnet support module.

The slide module of this invention permits the ready removal of the entire squeegee and magnet system from the main body. This new system allows remote bench repair of module mounted components instead of working in the confined framework of the presses and the conveyor.

The slide system for the module may consist of two extrusions that form runners which slidably fit on the cylindrical and parallel slide rails. The runners fit on and encapsulates most of the circumference of the rails so that the module is held in the main body by this sliding connection until axially removed therefrom. The rails are fixed to the floor of the main body by small diameter pedestals.

A face plate mounted to one outer end of the extrusions that serve as a closure and splash guard for the lower unit frame or main body. There is an outer handle that is operatively mounted to the face plate that serves as both a manual grip for axial movement of the module relative to the housing and an indicator that shows the amount of wear on the rubber-like material of the squeegee blades. The handle turns by action of a spring mechanism on the structure holding the squeegee blade on the belt and acts as a pointer on fixed indicia on the face plate to provide a squeegee wear detecting gauge.

The module has two main mounting plates rigidly attached to the upper surface of the extrusions that serve as supports for a pair of laterally-spaced uprights having a laterally extending magnet support tray mounted to the upper ends thereof and for a squeegee support and linkage system. Permanent magnets are mounted in the support tray that fastens to the top of the uprights so that they are immediately below the face of the belt. The uprights rigidly secured to the mounting plates and which extend upwardly therefrom provide the pivot support for the squeegee support linkage and squeegee assembly.

The squeegee assembly comprises an elongated body with a plurality of elongated blades of rubber or rubber-like material arcuately spaced from one another. The squeegee body can accordingly be indexed four times so that four different squeegee blades can be used to extend production hours with minimal preventive maintenance time. When one squeegee cartridge or assembly with four radial blades is worn out, it can be readily removed and a new squeegee cartridge preferably corresponding to the old one can be readily substituted therefor. The squeegee to belt pressure is provided by springs captured between the mounting plates and the outer ends of the spaced arms of the squeegee link gage. The squeegee cartridge is manually turned so that its operative blade is located directly below a squeegee back-up roller mounted in the upper frame when the unit is in operation.

These and other features, objects and advantages of the invention will become more apparent from the following detailed drawings and description in which:

DESCRIPTION OF THE PREFERRED EMBODIMENT

FIG. 2 is a pictorial view of the cleaner unit of FIG. 1 showing a slide module with parts not shown and being removed from the main body of the unit;

FIG. 3 is a pictorial view showing the main body of the belt cleaning unit swung downwardly on its side hinge attachment to the top frame for belt or cleaning unit service;

FIG. 5 is a pictorial view of a portion of the slide module with some parts removed.

DETAILED DESCRIPTION OF THE DRAWINGS

Figure 1:
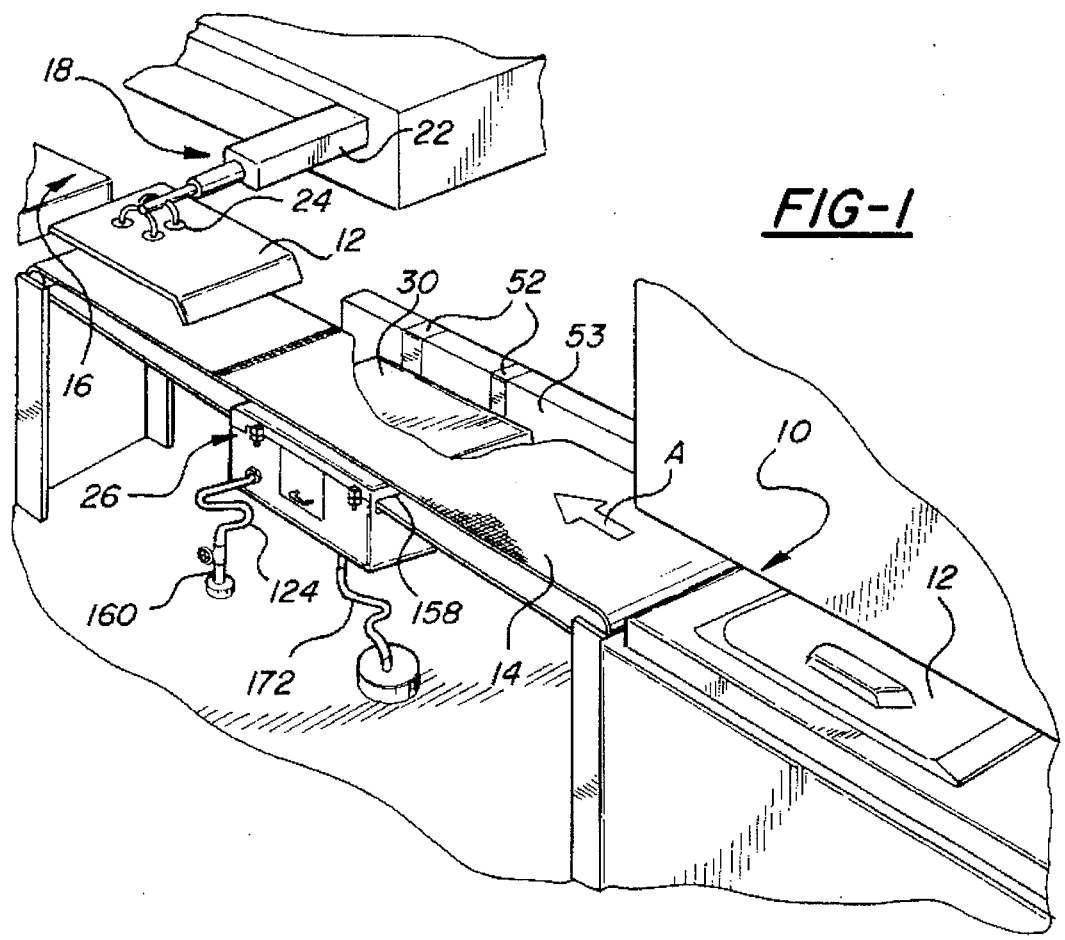
FIG. 1 is a pictorial view of a belt transfer system incorporating the belt cleaner unit of this invention.

Turning now in greater detail to the drawing, there is shown in FIG. 1 a press 10 at a first station with a die set for forming metal blanks 12. After a first stamping operation with press 10, the blanks 12 are loaded onto an endless transfer belt 14 that is powered to run in a selected direction such as shown by arrow "A" to move the blanks 12 toward a second station for further stamping operation by a stamping die set in press 16. A transfer unit 18 includes a transfer arm assembly 22 with suction cups 24 or other pick-ups for moving the blanks or parts 12 from the transfer belt into the die set of the second press.

To prevent the contamination of the blanks 12 or other stampings with belt born foreign matter otherwise known as "dirt" prior to delivery by a transfer belt system into a stamping station, the present invention provides a new and improved transfer belt cleaning unit 26. The belt cleaning unit 26 is operational to thoroughly spray wash and clean the flat and wide endless transfer belt when in use so that dirt thereon will be removed therefrom and contained for effective disposal and not be transmitted by the belt onto the blank or part being conveyed to a stamping or other station. This eliminates imperfections from foreign particles or dirt interfacing between the die and the blanks being stamped causing irregularities or pimpling to be formed in the surface of the stamping and subsequent rejection of the stamped part.

In one preferred form of the invention, the belt cleaning unit 26 comprises a rectilinear top frame 28 which is a box-like member having a solid top 30 and with peripheral end and side walls 32, 34 extending downwardly from the top 30. Operatively mounted for rotation in the top frame along side of opposing side walls 34 are cylindrical belt entry and belt exit back-up rollers 36, 38. These rollers are preferably mounted in anti friction bearings 40 supported by end walls 32 as diagrammatically shown in FIG. 3 to reduce friction during belt cleaning operation.

In addition to the belt entry and back-up rollers 36, 38 there is a stainless steel deflector plate 44 in the general shape of open box having a rectilinear belt support surface 46 and peripheral walls 47 which extend upwardly therefrom for weld or other securement to the solid top 30 of the top frame. Additionally, a squeegee back-up roller 48 is operatively mounted between a peripheral side wall of the deflector plate and the back-up belt exit roller 38. Preferably, the squeegee back-up roller 48 extends between and is mounted to the side walls 32 of the top frame so that it has a substantially fixed position relative to the flexible wiper blades of a squeegee unit 50.

The top frame 28 is removably secured to the transfer equipment by support bracketry 52 extending from its side wall 34 and a support rail. Threaded fasteners 54 or other releasable attachments are used to secure the top frame 28 to the brackets so that the top frame 28 can be released therefrom and removed from the transfer equipment.

As further shown in the drawing, the top frame 28 has a pair of elongated ear members 58 which are laterally spaced from one another being attached to and extending downwardly from opposite ends of side wall 32. These ear members provide a support for pivot pins that pivotally secure the box-like main body 60 of the cleaning unit thereto. More particularly, the pivot pins 62 carried at the lower ends of the ear members 58 extend transversely therethrough corresponding ears 63 on the peripheral side wall 64 of the main body 60.

The main body 60 of the cleaning unit is accordingly pivoted to the top frame 30 by the pivot pins and can be moved between the operational position such as shown in FIGS. 1 and 2 and the service position of FIG. 3. In the closed operational position of FIGS. 1 and 2, threaded fasteners 66 or other suitable fastener means can be utilized to secure the main body 30 to the top frame 60. The threaded fasteners thread through lugs 68, 69 respectively welded to the side walls of the upper frame and main body to keep these components in a closed operating position.

The main body 60 includes a removal squeegee and permanent magnet or cleaning module 70 removably mounted therein which comprises a pair of elongated runners 72, 72 which are slidably mounted on laterally spaced cylindrical rails 74 which are mounted by pedestals 75 to the bottom plate or floor 77 of the main body.

The runners may be provided by extrusions which have flattened tops on which a pair of laterally spaced support blocks 76 are secured. These blocks in turn support a pair of uprights 78, 78 thereon which serve as the pivot support for the squeegee capsule and its bracketry or carrier assembly.

This carrier assembly includes an elongated pivot rod 80 that extends through an outer face plate 82 of the module 70 and through the uprights 78. The pivot rod 80 also extends through the innermost upright 78 and is headed at its outer end so that it can turn but not be pulled axially therethrough. An exterior handle 84 secured to the outer end of the pivot rod 80 can be turned and pulled for removal of the module from the main body 80. A latching system, not shown, may be employed with the handle 84 to releasably secure the face plate 82 in its corresponding opening 86 in the front wall of the main body.

Figure 4:
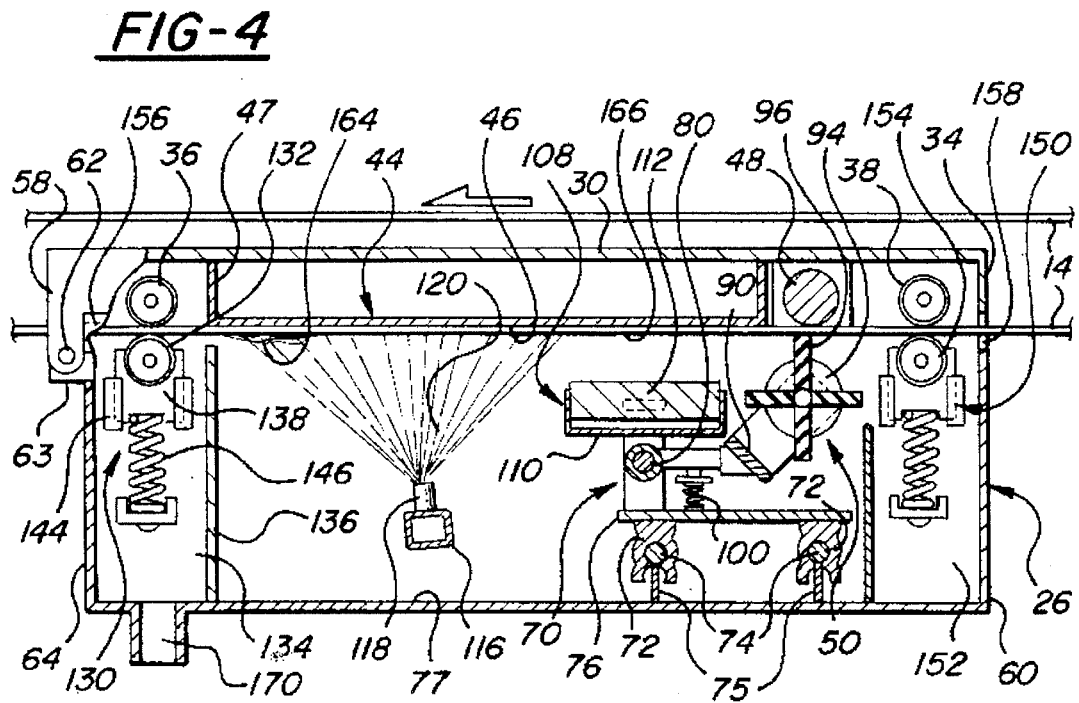
FIG. 4 is a sectional view taken generally along sight lines 4—4 of FIG. 2 but with the module in place.

Rigidly, attached to the pivot rod 80 of the squeegee mounting bracketry are a pair of laterally spaced extension arms 88 which rotate with the rod 80. The elongated arms 88 have fixed at their outer ends an elongated support plate 90 to which are rigidly attached second pair of laterally spaced arms 92. The outer end of the arms 92 have openings therein which provide mounting journals that receive the axial pins of a generally cylindrical squeegee capsule 94. As shown in FIG. 5, the squeegee capsule has four arcuately spaced and elongated rubber wiper squeegee blades 96 extending radially outward therefrom. The squeegee capsule is secured in any adjusted position in between the arms 92 by threaded nut members on the threaded pivot pins therefor. By loosening these nuts, the capsule can be indexed by manually turning to 90 degrees stations shown diagrammatically in FIG. 4 so that a selected blade 96 physically contacts the outer surface of the belt 14.

To maintain engagement of the squeegee blade with the outer lower surface of the belt 14, helical springs 100 extending between their mount on the support blocks 76 to the tabs 102 projecting inwardly from the arms 88. The springs are loaded to provide the spring force urging the squeegee blade carrier assembly in a clockwise direction in FIG. 5, and counterclockwise in FIG. 4 to hold the squeegee blades in operative spring biased contact with the outer surface of the belt 14.

In addition to supporting the rotatable adjustable squeegee blade capsule and its carrier assembly, the module 70 further carries a permanent magnet and magnet mounting unit 108 which may consist of an elongated support tray 110 secured to the upper end of the uprights 78 and which has permanent magnets 112 operatively mounted therein which are positioned immediately below the belt.

In addition to the cleaning module 70 supporting the removable squeegee and permanent magnet, the main body 60 of the belt cleaning unit carries the spray wash manifold 116 which extends laterally across and immediately above the floor of the main body. This manifold has its far end sealed and welded or otherwise attached to the far wall of the main body. The manifold has a plurality of laterally-spaced and upwardly-directed nozzles 118 to direct sprays 120 of the belt wash fluid fed into the manifold 116 from a flexible supply hose 124 connecting into a manifold fitting 126 secured in the near wall of the main body 60.

To adjustably support the belt at the belt entrance side of the main body 60 end of the unit, a spring and gibb guide system 130 adjustably supporting entrance roller 132 is employed. As shown best in FIG. 4, the elongated floating entrance roller 132 is mounted in a forward pocket 134 formed by a splash buffer 136 and the side wall 64 of the main body. The gibb guide system includes a roller mounting carrier 138 slidably mounted in a pair of spaced and upwardly extending tracks 144. A helical springs 146 grounded to the adjacent side wall and seated against carrier 138 urges the support roller against the outer face of the belt 14.

A similar spring gibb and guide system 150 is provided in a pocket 152 in the exit end of the unit which has an exit roller 154 cooperating with the exit back-up roller 38 to support and guide the belt as it leaves the cleaner unit. The rollers, belt support and back-up, accommodate belts of a wide range of thicknesses and provide good fluid sealing with the belt to help keep the fluid in the unit. With this construction, the escape of washing fluid from the housing through the belt entry and exit slots 156, 158 is minimized.

The belt cleaning unit 26 is fed with a suitable belt washing fluid from a pressurized source connected to supply line 160 that is in turn connected to the input of the flexible hose 124 and thus to the spray wash manifold 116 such as shown in FIGS. 1–3. Overlapping spray cones 120 of pressurized washing fluid are directed by the nozzles 118 across the entire outer surface of the belt 14 which are effective to impact, loosen, dislodge and wash foreign matter, such as the accumulation of blank wash concentrate 164 and particles from the surface of the belt. Ferrous metallic particles 166 still adhering to the face of the belt are attracted by permanent magnets 112 to collect on the poles thereof. In the event that dirt and particles are not removed from the belt by the cones of pressurized spray and the magnets, the squeegee blades 96 will physically contact and dislodge such particles or other dirt from the belt and such material will fall into the main body 60 and be washed out by the belt cleaning liquid discharged through drain 170 which is connected to a containment reservoir by flexible tube 172.

Metal particles, such as bits or shavings of ferrous material that have become imbedded or otherwise stuck to the support surface of the belt are removed by the flux of the permanent magnet. After accumulating on the magnet, such dirt is subsequently removed in a manner.

Since such dirt has been prevented from exiting the unit 26, particles will not be picked up by the blank or part being fed into the stamping press.

As the squeegee blade becomes worn, the spring system will cause the pull handle 84 to gradually turn to a position where it aligns with indicia B in FIG. 3 so that an operator will be informed that the squeegee blade is sufficiently worn that its effectiveness is reduced and requires the use of a new blade. Accordingly, the squeegee and permanent magnet module can be moved to the FIG. 2 position and the blade module turned 90 degrees to effectively position a new blade in operative position below the back-up roller to scrape the support surface of the belt. In the event that the squeegee blades or permanent magnets or other components of the module need repair or replacement, the module can be readily removed and taken to a remote location for repair or other replacement service.

A new module can be readily inserted into the washer unit while the first module is being refurbished so that there is no downtime for belt cleaning purposes. In any event, the washer is effective to remove all the dirt from the belt so that all the particles will not be transferred onto the stamping blanks or other parts being conveyed to eliminate part contamination which would show up as defects in subsequent stamping, and as further amplified by a paint job.

In the event the belt is to be replaced, the unit can be opened to the FIG. 3 position and the detached end of the belt fed past the inlet and exit rollers in the top of the unit. The belt can then be reconnected so that it is again endless and ready to be driven. The unit 26 is then closed and bolted in position for belt cleaning operation.

While the invention has been disclosed as washing belts to prevent contamination of parts being stamped, it will be appreciated that the invention is applicable to any belt cleaning operation, such as when parts being moved to a finalized paint position. This prevents contamination of parts being conveyed so that paint spraying of such parts produces a fine finish with no irregularities.

While a preferred embodiments and methods of the invention has been shown and described, other embodiments and methods will now become apparent to those skilled in the art. Accordingly, this invention is not to be limited to that which is shown and described but by the following claims.

What is claimed is:

1. A cleaning unit for removing dirt from moving conveyor belts adapted to move articles supported thereon comprising an upper frame, a main body releasably secured to said frame having a floor and a peripheral wall extending upward therefrom to define a cleaning cavity, said upper frame and said peripheral wall of said main body cooperating to provide a belt entrance and a belt exit spaced from one another, a cleaning fluid director operatively mounted in said cavity for directing washing fluid onto portions of said belt extending between said belt entrance and said belt exit, said floor and said peripheral wall cooperating to define a container for confining any dirt washed from said belt after the washing fluid has been directed onto said belt by said fluid director, said container having a fluid drain for evacuating belt washing fluid and said dirt washed from said belt, a cleaning module adapted to be supported in said cavity, an opening in said peripheral wall of said main body to provide access to said cleaning module, a face plate associated with said main body for closing said opening operatively secured to said cleaning module, track means disposed in said cavity movably mounting said cleaning module thereon, a wiper blade mounted on said module for contacting and wiping the outer side of said belt.

2. The cleaning unit of claim 1, and further including a permanent magnet, a support on said module for mounting said permanent magnet in a position adjacent to the outer surface of said belt for attracting ferrous based metal particles from the outer surface of said belt onto said magnet.

3. The cleaning unit of claim 1, and further including belt supporting rollers in said main body adjacent to the belt entrance and said belt exit.

4. The cleaning unit of claim 3, and further including back-up rollers mounted in said top frame immediately above said belt supporting rollers in said main body.

5. The cleaning unit of claim 1, wherein said wiper blade is an elongated blade extending substantially across the width of said belt and a movable support for said wiper blade, and at least one spring for urging said wiper blade against the outer face of said belt.

6. The cleaning unit of claim 6, wherein said wiper blade is a part of squeegee unit for wiping liquid and foreign matter from said belt as said belt passes through said unit.

7. The cleaning unit of claim 6, wherein said squeegee unit has a plurality of wiper blades mounted thereon and pivot member for attaching said squeegee on said movable support so that said squeegee can be indexed to any belt wiper blade thereon can be moved into engagement with said belt.

8. The cleaning unit of claim 7, wherein said upper frame has a belt back-up plate disposed above said belt to back-up and stabilize said belt when said belt is being sprayed with said belt washing fluid.

9. A cleaning unit for removing dirt from conveyor belts adapted to move articles supported thereon comprising a fixed upper frame, a main body releasably secured to said frame having a floor and a peripheral wall extending upward therefrom to define cleaning cavity, a cleaning module adapted to be supported in said cavity, an opening in said peripheral wall of said main body to provide access to said cleaning module, a face plate associated with said main body for closing said opening operatively secured to said cleaning module, track means disposed in said cavity movably mounting, said cleaning module thereon, a belt contacting squeegee operatively mounted on said module, said upper frame and said peripheral wall of said main body cooperating to provide a belt entrance and a belt exit spaced from one another, a cleaning fluid director operatively mounted in said cavity for directing washing fluid onto portions of said belt extending between said belt entrance and said belt exit, said floor and said peripheral wall cooperating to define a container for confining the washing fluid directed onto said belt by said fluid director, said container having a fluid drain for evacuating belt cleaning fluid from said container after said fluid has been directed onto said belt by said cleaning fluid director.

10. The cleaning unit of claim 1, and further including a first pair of opposed belt guiding rollers adjacent to the belt entrance cooperating to guide the belt therebetween, a second pair of belt guiding rollers adjacent to the belt exit to guide the belt therebetween, and an adjustable mount for one of the rollers of each pair of rollers so that the space between the rollers of each pair can be varied in accordance with the thickness of the belt.

11. A cleaning unit for removing dirt from moving conveyor belts adapted to move articles supported thereon comprising means providing a housing defining a cleaning cavity, means providing a belt entrance to and a belt exit from said cavity in spaced apart relation to one another, a cleaning fluid director operatively mounted in said cavity for directing washing fluid onto portions of said belt extending within said cavity between said belt entrance and said belt exit, said housing defining a container in said cavity for collecting any dirt washed from said belt by the washing fluid and discharging the same, a cleaning module adapted to be supported in said cavity, an opening in said housing providing access to said cleaning module, a face plate for closing said opening operatively secured to said cleaning module, track means disposed in said cavity movably mounting said cleaning module thereon, and a wiper blade mounted on said module for contacting and wiping the outer side of said belt.

* * * * *